3,323,369
PRESSURE REDUCING APPARATUS
Donald D. Kallenbach, Cheyenne, Wyo., assignor, by mesne assignments, to Ideal-Aerosmith, Inc., Cheyenne, Wyo., a corporation of Wyoming
Filed Sept. 14, 1964, Ser. No. 396,321
9 Claims. (Cl. 73—407)

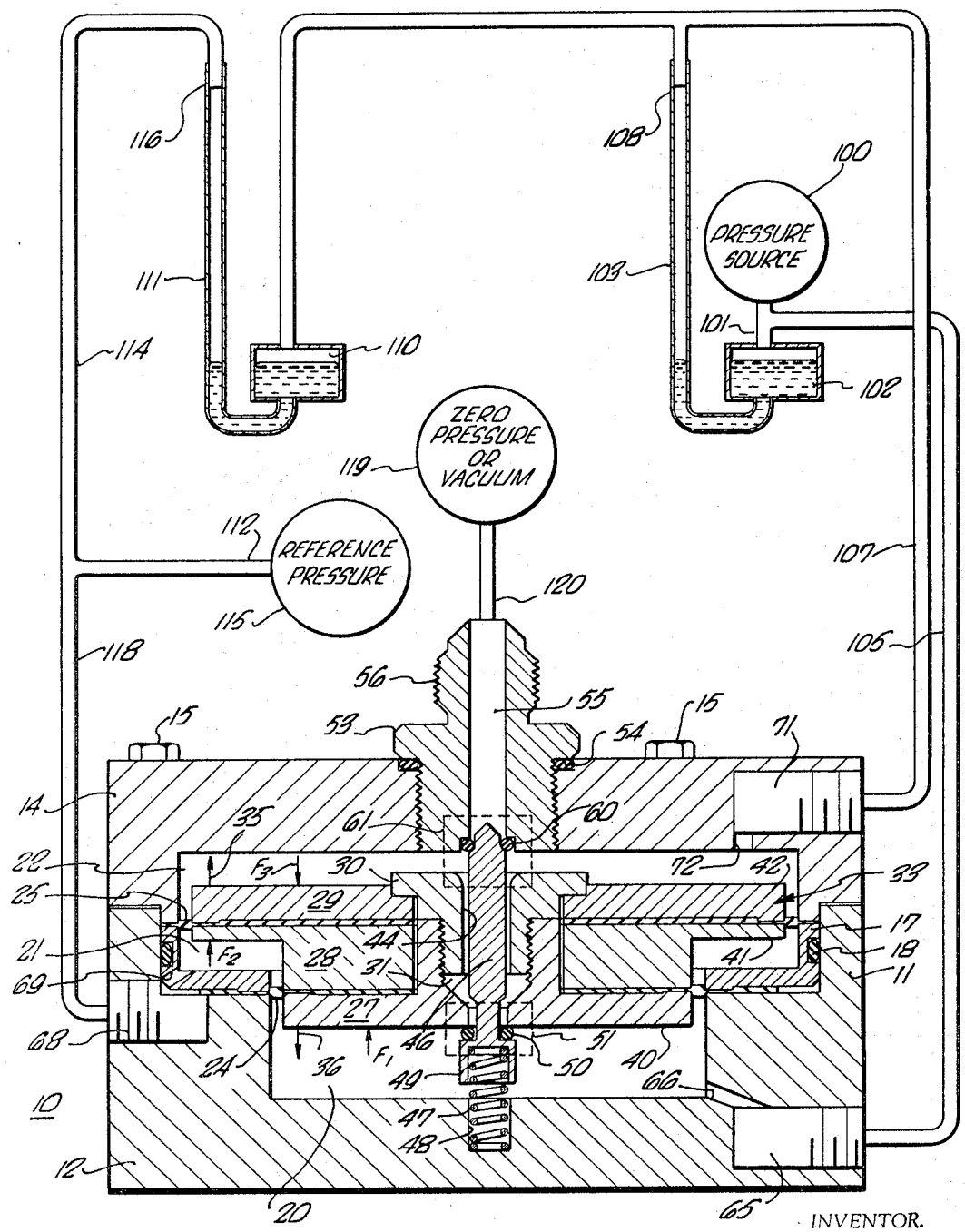

The subject invention relates to the art of pressure attenuation and, more particularly, to apparatus for reducing the pressure of a fluid by a predetermined factor.

The general utility of pressure reducing apparatus is well known in the art. The subject invention will, therefore, be described in connection with manometer systems, inasmuch as these systems place particularly high accuracy requirements on their auxiliary equipment.

In the art of manometer systems, it is frequently desirable to have equipment which extends the measuring range of a given manometer. This is particularly true if the manometer is of the mercury-column type, since the height of a mercury column for measurements within larger pressure ranges frequently assumes prohibitive dimensions. In the past, various regulator systems have been proposed for permitting mercury manometers of manageable dimensions to indicate pressures within widely varying ranges. As a rule, these prior-art systems were characterized by a multitude of valves and regulators. One exception of this rule is found in U.S. Patent 2,849,833, issued Sept. 2, 1958, to W. I. Chapman, which discloses a manometer system of striking simplicity. The basic embodiment of Chapman's system comprises a principal manometer and an auxiliary manometer. Each of these manometers is of the mercury-column type and has a well and a measuring tube. The fluid pressure to be measured is applied to the top of the measuring tube of the principal manometer. If this fluid pressure exceeds the range of the principal manometer, an opposing fluid pressure is applied to the well of this manometer. The principal manometer indicates then only the pressure difference between the fluid pressure to be measured and the opposing fluid pressure. In this manner, the measurement range of the principal manometer is extended. The opposing fluid pressure acts also on the auxiliary manometer, so that the sum of the readings of the principal and auxiliary manometers indicates the pressure of the fluid being measured.

According to Chapman, the above-mentioned opposing pressure is admitted to the well of the principal manometer by a valve which is biased to a closed position by a spring and is actuated to an open position by a membrane which is initially responsive to the fluid pressure to be measured. The valve biasing spring is dimensioned so that the membrane will be able to open the valve when the fluid pressure to be measured exceeds the normal range of the principal manometer.

Should the above-mentioned valve biasing spring fail to yield before the fluid pressure to be measured exceeds the maximum range of the principal manometer, mercury will be forced from the well of this manometer into the remainder of the system or damage to the manometer will result. Failure of the above-mentioned opposing fluid pressure during high-pressure measurements will produce similar results.

The subject invention overcomes these disadvantages and employs a novel principle of pressure reduction which obviates reliance on the functioning, proper dimensioning and endurance of a spring.

The apparatus according to the invention reduces or divides the fluid pressure to be measured by a predetermined factor. To this end, the apparatus comprises a housing having an input chamber and an output chamber. A piston arrangement is mounted in the housing for movement in a first direction and selectively in an opposite, second direction. The piston arrangement defines a first piston surface in the input chamber and a second piston surface in the output chamber. The first piston surface faces in the mentioned second direction and the second piston surface in the first direction. According to the invention, the area of the second piston surface corresponds to the area of the first piston surface multiplied by the above-mentioned predetermined factor. For example, if the fluid pressure is to be reduced or attenuated by a factor of two, the area of the second piston surface in the output chamber is twice the area of the first piston surface in the input chamber.

Valve means are located in the above-mentioned housing and are constructed to assume an open position in response to movement of the piston arrangement in the first direction, and a closed position in response to movement of the piston arrangement in the above-mentioned second direction. In their open position, the valve means interconnect the input and output chambers. In their closed position, the valve means isolate the output chamber from the input chamber. Means are provided for venting the output chamber in response to a pressure drop in the input chamber. The apparatus further includes means for applying a fluid the pressure of which is to be measured to the input chamber, and means for deriving pressurized fluid from the output chamber.

Pressurized fluid admitted to the input chamber will develop a pressure on the first piston surface which will move the piston arrangement in the above-mentioned first direction. In response to such piston movement, the above-mentioned valve means will open and permit pressurized fluid to flow from the input chamber to the output chamber. The pressure thus building up in the output chamber will develop a force on the second piston surface which will tend to move the piston arrangement in the above-mentioned second direction, opposite the aforesaid first direction. Since the area of the second piston surface corresponds to the area of the first piston surface multiplied by the predetermined reduction or attenuation factor, the force produced at the second piston surface will be able to overcome the force produced at the first piston surface after the pressure in the output chamber has attained a value equal to the pressure in the input chamber divided by the above-mentioned factor. The piston arrangement will thus tend to move in the above-mentioned second direction and the valve means between the input and output chambers will close.

The pressure in the output chamber, as compared to the pressure in the input chamber, is thus reduced or attenuated by the above-mentioned predetermined in a simple, convenient and accurate manner.

Whenever the pressure in the input chamber drops, the piston arrangement tends to move further in the above-mentioned second direction. This movement may be utilized to provide for a venting of the output chamber. For example, the output chamber can be provided with a vent opening or conduit having associated therewith a valve which opens in response to a predetermined amount of movement of the piston arrangement in the above-mentioned second direction. In this manner, the apparatus of the invention will be able to follow fluctuations in the fluid pressure to be measured.

Within practical limits, any desired pressure reduction or attenuation may be realized by an appropriate dimensioning of the piston surface in the output chamber, as compared to the piston surface in the input chamber. Thus, the area of the piston surface in the output chamber may be two, three or four times the area of the piston surface in the input chamber, depending on whether a pressure attenuation by a factor of two, three or four is desired.

Those skilled in the art will recognize that a manometer connected to the output chamber of the reduction or attenuation apparatus of the subject invention will be able to measure pressures which exceed the measuring range of the manometer by a factor of two, three, four or $n$, whereby $n$ designates the area of the piston surface in the output chamber relative to the area of the piston surface in the input chamber.

Of course, if this simple arrangement is used, care should be taken that the friction of the piston arrangement relative to the apparatus housing is as small as possible. In modern instrumentation engineering, the friction between cylinder housings and piston arrangements sliding therein is frequently reduced by employing auxiliary equipment for rotating the cylinder continuously about its axis of rotational symmetry. This measure which reduces static friction is, for example, known in the art of dead weight testers.

Alternatively, certain frictional forces or certain hysteresis in the performance of the reduction or attenuation apparatus may be tolerated, provided some compensatory measures of the type more fully described below are taken.

In a preferred embodiment of the invention, the above-mentioned housing defines a reference chamber in addition to the input and output chambers. The piston arrangement defines a third surface in this reference chamber. This third surface faces in the same direction as the above-mentioned first surface in the input chamber. The third piston surface is dimensioned so that the area of the second piston surface in the output chamber is equal to the sum of the areas of the first piston surface in the input chamber and the third piston surface in the reference chamber. A reference fluid pressure is then applied to the reference chamber. This reference pressure may be equal to a component, such as atmospheric pressure, contained in the fluid pressure to be measured. A manometer connected to the output chamber of the apparatus will then indicate relative, rather than absolute pressure, unless the reference chamber is evacuated.

A certain static friction in the apparatus or hysteresis in performance or other inaccuracy in the fluid attenuation can largely be compensated in the following manner:

The source of the fluid pressure to be measured is connected to the well of a principal member and to the input chamber of the apparatus. The output chamber of the apparatus is connected to the top of the measuring tube of the principal manometer, and to the well of an auxiliary manometer. Equipment supplying fluid of the desired reference pressure is connected to the reference chamber of the apparatus and to the top of the measuring tube of the auxiliary manometer.

With this arrangement, the sum of the pressure readings of the principal and auxiliary manometers will constitute the ultimate pressure reading, and inaccuracies in the division of the pressure of the fluid in the output chamber will be compensated in the ultimate reading, since the latter fluid is applied to the measuring tube of the principal manometer and the well of the auxiliary manometer. The detailed operation of this latter embodiment will become readily apparent from a consideration of the accompanying drawing and related description.

This drawing shows by way of example an elevation in section of a preferred embodiment of the invention, and also illustrates schematically two manometers and certain auxiliary equipment.

The apparatus 10 shown in the drawing includes a housing 11 composed by a pair of mating shells 12 and 14 which are held together by a number of bolts 15. The housing 11 also includes an insert 17 which is sealed to the lower shell 12 by an annular seal 18. The housing 11 has an input chamber 20, a reference chamber 21 and an output chamber 22. Chambers 20 and 21 are separated by an elastic membrane 24 mounted by the lower housing shell 12 and the insert 17. Chambers 21 and 22 are separated by an elastic membrane 25 mounted by the insert 17 and the upper housing shell 14. A first piston element 27 is located on membrane 24. A second piston element 28 is held between membranes 24 and 25. A third piston element 29 is located on membrane 25. A threaded nipple 30 engages piston element 29 and an internal thread 31 in piston element 27. Piston elements 27, 28 and 29, together with nipple 30 and portions of membranes 24 and 25, thus constitute a piston assembly or arrangement 33 which is movable in housing 11 in a first direction indicated by an arrow 35 and a second direction indicated by arrow 36. The piston arrangement 33 defines a first piston surface 40 in the input chamber 20, a second piston surface 41 in the reference chamber 21 and a third piston surface 42 in the output chamber 22.

The piston arrangement 33 also defines an axial passage or conduit 44 which extends between the input and output chambers 20 and 22. A valve stem 46 extends through conduit 44 and is biased in the direction indicated by arrow 35 by a helical spring 47. One end of spring 47 extends into a bore 48 in the bottom of the lower housing shell 12, and the other end of spring 47 extends into a cap member 49 on which valve stem 46 is mounted. An annular sealing ring 50 is located on cap member 59 and extends around the lower end of valve stem 46. Sealing ring 50 completes a valve 51 located in the input chamber 20 and at the piston surface 40. Spring 47 provides a sufficient bias to maintain the valve 51 in a closed position when the piston arrangement 33 is in the rest position shown in the drawing.

The apparatus 10 includes a vent for the output chamber 22 in the form of a nipple 53 threaded to the upper housing shell 14 and sealed thereto by an annular sealing ring 54. Nipple 53 defines a longitudinal passage 55, and has a threaded end portion 56 for the connection of a conduit thereto. A sealing ring 60 is mounted on the upper end of valve stem 46. This sealing ring 60, which fits into a corresponding cavity in nipple 53, completes a second valve 61 for selectively venting the output chamber 22 through the passage 55. Spring 47 maintains this valve 61 closed when the piston arrangement is in its illustrated rest position or moves from such position in the direction of arrow 35. Valve stem 46 is dimensioned such that valve 61 will be open in response to movement of the piston arrangement 33 beyond its illustrated rest position and in the direction of arrow 36.

An internally threaded bore or port 65 and a passage 66 in lower housing shell 12 permit access of pressurized input fluid to the input chamber 20. An internally threaded bore or port 68 in lower housing shell 12 and a passage 69 in insert 17 permit the access of pressurized reference fluid to the reference chamber 21. A further internally threaded bore or port 71 and a passage 72 in upper housing shell 14 permit the flow of fluid and the promulgation of pressure from the output chamber 22.

The operation of the illustrated apparatus can be described as follows:

First, it is assumed for the purpose of discussion that the fluid pressure to be measured is to be reduced or attenuated by the illustrated apparatus 10 by a factor of two, and that the area of the piston surface 42 is thus twice the area of the piston surface 40. For the moment, it is further assumed that a differential or relative measurement, as to the pressure of the fluid above atmospheric pressure, is to be taken.

Initially, a reference pressure of one atmosphere is established in the reference chamber 21. A fluid, the pressure of which is to be measured, is admitted to the inlet chamber 20. The pressure of this inlet fluid may be expressed as $p_a + p_1$, wherein $p_a$ is the atmospheric pressure component and $p_1$ is the pressure component above atmospheric pressure in the total pressure of the inlet fluid. If the area of piston surface 40 is expressed as $A_1$, the inlet fluid pressure will develop a force $F_1$ on the piston surface 40 which may be expressed by the following formula:

$$F_1 = (p_a + p_1)A_1$$

This force will act in the direction of arrow 35. Another force which acts in this direction is force $F_2$ which acts on piston surface 41 in the reference chamber 21 and which may be expressed by the following equation:

$$F_2 = p_a A_2$$

wherein $p_a$ is the atmospheric pressure admitted to reference chamber 21 as mentioned above, and $A_2$ is the area of piston surface 41.

The forces $F_1$ and $F_2$ acting on piston surfaces 40 and 41, respectively, will move the piston arrangement 33 in the direction of arrow 35. Valve 51 will thus be opened and fluid will flow from the input chamber 20 through the conduit 44 to the output chamber 22. The pressure of this fluid in output chamber 22 will establish on piston surface 42 a force $F_3$ which may be expressed by the following equation:

$$F_3 = (p_a + p_3)A_3$$

wherein $p_a$ is the atmospheric pressure component and $p_3$ is the pressure component above atmospheric pressure of the fluid pressure in output chamber 22. $A_3$ is the area of piston surface 42. At this instant, it will be recalled that the area of piston surface 42 is equal to the sum of the areas of piston surfaces 40 and 41. This equality may be expressed by the equation $$A_3 = A_1 + A_2$$

It will also be recalled that the area $A_3$ of the piston surface 42 is equal to the area of the piston surface 40 multiplied by the predetermined factor by which the input fluid pressure is to be reduced or attenuated. If this reduction is to take place by a factor of two, the following equation applies:

$$A_3 = 2A_1$$

The area $A_2$ of piston surface 41 is then also equal to the area $A_1$ of the piston surface 40.

As fluid continues to flow from the input chamber 20 to the output chamber 22, there will be reached a point where the force $F_3$ is equal to the sum of the forces $F_1$ and $F_2$. By employing the above algebraic expressions of the forces $F_1$, $F_2$ and $F_3$, the following equation can be established to cover this instant of balancing forces:

$$(p_a + p_1)A_1 + p_a A_1 = (p_a + p_3)2A_1$$

From this formula, the following simplified equation is obtained by eliminating the common factor $A_1$:

$$p_a + p_1 + p_a = 2p_a + 2p_3$$

The value of $2p_a$ may be subtracted from each side of this equation, so that this formula is further simplified to the following equation:

$$p_1 = 2p_3$$

This means that the pressure $p_3$ in the output chamber 22 is one half the relative pressure in input chamber 20 or expressed in other words, is reduced or attenuated by a factor of two. This fact may be expressed by the following equation:

$$p_3 = 1/2 p_1$$

A manometer connected to output chamber 22 will thus measure a pressure of only one half the relative fluid pressure in input chamber 20. If a mercury-column manometer is used, this means that the mercury column need only have a maximum height corresponding to one half the maximum fluid pressure to be expected of the fluid being tested. If desiired, the manometer may, of course, be suitably calibrated so that it will still indicate the full pressure range.

Absolute pressure measurements effected in the same manner, except that no force $F_2$ in the direction of arrow 35 is established in the reference chamber 22.

The balancing forces mentioned above will return the piston arrangement 33 to its rest position illustrated in the drawing. The valve 51 will thus be closed and the fluid flow through conduit 44 will be interrupted. As indicated above, this will take place when the desired reduced or attenuated pressure has been established in output chamber 22.

A reduction in the fluid pressure in input chamber 20 will result in an attenuation of the force $F_1$ which acts on piston surface 40. The force $F_3$ acting on piston surface 42 will thus be able to move the piston arrangement 33 in the direction of arrow 36. This downward movement will be imparted on the valve stem 46. Accordingly, the valve 61 will be opened and the output chamber 22 will be vented until the force $F_3$ on piston surface 42 is sufficiently attenuated to permit the piston arrangement to assume its illustrated rest position. This attenuation of force $F_3$ is caused by a corresponding attenuation in the fluid pressure in output chamber 22, which pressure will be indicated by a manometer connected to the output chamber.

An increment in the fluid pressure in input chamber 20 will again result in movement of the piston arrangement 33 in the direction of arrow 35 and the flow of fluid from the input chamber 20 through the conduit 44 to the output chamber 22, until the above mentioned equilibrium of the various forces acting on the pison arrangement 33 is reached, at which time valve 51 will be closed in the manner described above.

It will now be recognized that the illustrated apparatus is a relatively simple but effective and versatile means for reducing or attenuating fluid pressure in an accurate and reliable manner.

In my experiments, I have ascertained that apparatus of the type shown in the drawing may tend to display certain inaccuracies in performance, which may influence high precision measurements. These inaccuracies may be due to deviations from exact dimensions within manufacturing tolerances. The membranes 24 and 25 also display a certain hinge action and an inherent friction. Frictions in the membranes may bring about a certain memory action in that the membranes will not always return exactly to their initial positions after each flexing operation.

The membranes could, of course, be replaced by peripheral sealing surfaces on the various piston elements. However, this still would result in static friction between the piston elements and the adjacent inner surface portions of housing 11. As indicated above, this static friction could be broken by rotating the piston arrangement 33 about its axis of rotational symmetry in a manner known per se. On the other hand, since the use of membranes results in a particularly simple apparatus, the use of an auxiliary manometer in addition to the principal manometer may be indicated in many applications, so that errors introduced by frictional phenomena may be compensated without complicating the structure of the attenuation apparatus.

The drawing illustrates an arrangement of the latter type. In this arrangement, the source 100 of the fluid pressure to be measured is connected by a conduit 101 to to the well 102 of a mercury-column manometer 103, and by a conduit 105 to the input port 65 of the input chamber 20 of apparatus 10. A conduit 107 connects the output port 71 of output chamber 22 of apparatus 10 to the measuring tube 108 of the principal manometer 103, and to the well 110 of an auxiliary manometer 111. Two conduits 112 and 114 connect a source of reference pressure fluid 115 to the measuring tube 116 of the auxiliary manometer 111. A further conduit 118 connects this reference source 115 also to the inlet port 68 of the reference chamber 21 of apparatus 10. The reference source 115 supplies a pressure corresponding to the reference from which measurements are to be taken. If absolute pressure measurements are to be taken, the reference pressure is adjusted to zero. This means that a vacuum pump or similar equipment may then be used as a reference pressure source 115.

The event nipple 53 is connected to a zero pressure or vacuum apparatus 119 by a conduit 120. If the reference pressure is to be different from zero, the source 115 may be an appropriately regulated pumping or exhausting or selective pumping and exhausting arrangement of a type known per se. The zero pressure or vacuum apparatus 119 may be a vacuum pump which removes fluid from vent nipple 53. Alternatively, the port 68 of reference chamber 21, the conduit 55 of vent nipple 53 and the high-pressure side 116 of the auxiliary manometer 111 may be left open to atmosphere, if the reference pressure is to be the pressure of the environment in which the structure shown in the drawing is located.

In the illustrated embodiment, the fluid of which the pressure is to be measured is applied to the well 102 of the principal manometer 103. A loop including conduit 105, apparatus 10 and conduit 107 applied an opposing pressure to the manometer 103. This opposing pressure is equal to the fluid pressure to be measured reduced by the reduction or attenuation factor realized in apparatus 10 in the manner described above. The principal manometer 103 will thus experience a resulting pressure which is equal to the fluid pressure to be measured minus the attenuated fluid pressure supplied by apparatus 10.

The auxiliary manometer 111 is subjected to a pressure which is equal to the attenuated pressure supplied by apparatus 10 minus the reference pressure. It follows, therefore, that the sum of the reading indicated by the principal manometer 103 and the reading indicated by the auxiliary manometer 111 will be equal to the pressure supplied at that instant by source 100 minus the reference pressure supplied by source 115. If the reference pressure is of a value other than zero, the pressure readings will be in terms of relative or differential pressure. If the reference pressure is zero, absolute pressure measurements will be obtained.

Error pressures occurring in the output chamber 22 of apparatus 10 due to manufacturing tolerances, internal friction or hysteresis phenomena, such as at the membranes 24 and 25, are applied in the illustrated system to the measuring tube of the principal manometer 103 and the well of the auxiliary manometer 111 and will thus be compensated as far as the ultimate readings of these manometers are concerned.

It will now be recognized that the subject invention proposes and realizes novel principles and apparatus for handling and attenuating pressures in a convenient and reliable manner. While specific embodiments and particular examples of utility have been described and illustrated, various modifications and additional areas of application of the principles of the inevntion will be apparent or suggest themselves to those skilled in the art.

I claim:

1. Apparatus for reducing the pressure of a fluid by a predetermined factor, comprising:
   (a) a housing having an input chamber, a reference chamber and an output chamber;
   (b) means movably mounted in the housing and defining a first piston surface in the input chamber, a second piston surface in the reference chamber, and a third piston surface in the output chamber, the third piston surface having an area equal to the sum of the areas of the first and second piston surfaces and equal to the result obtained by multiplying the area of the first piston surface by said predetermined factor;
   (c) means for conducting fluid from the input chamber to the output chamber when the fluid pressure in the output chamber is lower than a pressure equal to the fluid pressure in the input chamber reduced by said predetermined factor;
   (d) means for venting the output chamber when the fluid pressure in the output chamber is higher than a pressure equal to the fluid pressure in the input chamber reduced by said predetermined factor;
   (e) means for applying a fluid under pressure to the input chamber;
   (f) means for establishing a reference pressure in the reference chamber; and
   (g) means for obtaining pressurized fluid from the output chamber.

2. Apparatus for reducing the pressure of a fluid by a predetermined factor, comprising:
   (a) a housing having an input chamber, a reference chamber and an output chamber;
   (b) a piston arrangement mounted in the housing for movement from an initial position in the direction of the output chamber and selectively in the direction of the input chamber, said piston arrangement defining a first piston surface in the input chamber, a second piston surface in the reference chamber, and a third piston surface in the output chamber, the third piston surface having an area equal to the sum of the areas of the first and second piston surfaces and equal to the result obtained by multiplying the area of the first piston surface by said predetermined factor and said piston arrangement defining a fluid conduit from the input chamber to the output chamber;
   (c) a valve responsive to movement of said piston arrangement for controlling fluid flow through said conduit, said valve opening said conduit in response to movement of the piston arrangement from said initial position in the direction of the output chamber, and said valve closing said conduit when the piston arrangement is in said initial position and mantaining said conduit closed in response to movement of the piston arrangement from said initial position in the direction of the input chamber;
   (d) means responsive to movement of said piston arrangement from said initial position in the direction of the input chamber for venting the output chamber;
   (e) means for applying a fluid under pressure to the input chamber;
   (f) means for establishing a reference pressure in the reference chamber; and
   (g) means for obtaining pressurized fluid from the output chamber.

3. Apparatus for reducing the pressure of a fluid by a predetermined factor, comprising:
   (a) a housing having an input chamber, a reference chamber and an output chamber and defining a first inlet for admitting pressurized fluid to the input chamber, a second inlet for admitting fluid to and permitting selective withdrawal of fluid from the reference chamber, a fluid outlet connected to the output chamber, and a centrally located vent opening extending from the output chamber;
   (b) a piston arrangement mounted in the housing for movement from an initial position in the direction of the output chamber and selectively in the direction of the input chamber, said piston arrangement defining a first piston surface in the input chamber, a second piston surface in the reference chamber, and a third piston surface in the output chamber, the third piston surface having an area equal to the sum of the areas of the first and second piston surfaces and equal to the result obtained by multiplying the area of the first piston surface by said predetermined factor, and said piston arrangement defining a fluid conduit aligned with said vent opening and extending between said inlet chamber and said outlet chamber;
   (c) a pair of valves located in the housing and having a common valve stem extending through said fluid conduit defined by the piston arrangement and being actuated by said piston arrangement, one of said valves being located at said vent opening and being constructed to maintain said vent opening closed until the piston arrangement moves in the direction of the input chamber past said initial position, and the other of said valves being located at said fluid conduit defined by the piston arrangement and being constructed to maintain said vent opening closed until the piston arrangement moves in the direction of the output chamber beyond said initial position.

4. Apparatus for reducing the pressure of a fluid by a predetermined factor, comprising:
(a) a housing having an input chamber, a reference chamber and an output chamber, and defining a first inlet for admitting pressurized fluid to the input chamber, a second inlet for admitting fluid to and permitting selective withdrawal of fluid from the reference chamber, and a fluid outlet connected to the output chamber;
(b) a first flexible membrane extending across and separating the input chamber from the reference chamber;
(c) a second flexible membrane extending across and separating the output chamber from the reference chamber;
(d) means located on the first membrane and in the input chamber for defining a first piston surface in the input chamber;
(e) means located on the second membrane and in the reference chamber for defining a second piston surface in the reference chamber;
(f) means located on the second membrane and in the output chamber for defining a third piston surface in the output chamber, the third piston surface having an area equal to the sum of the areas of the first and second piston surfaces and equal to the result of a multiplication of the area of the first piston surface by said predetermined factor;
(g) means for conducting fluid from the input chamber to the output chamber when the fluid pressure in the output chamber is lower than a pressure equal to the fluid pressure in the input chamber reduced by said predetermined factor; and
(h) means for venting the output chamber when the fluid pressure in the output chamber is higher than a pressure equal to the fluid pressure in the input chamber reduced by said predetermined factor.

5. Apparatus for measuring the pressure of a fluid, comprising:
(a) a manometer;
(b) a housing having an input chamber, a reference chamber and an output chamber, and defining an inlet for admitting to the input chamber the fluid the pressure of which is to be measured, and an outlet communicating with the output chamber and connected to the manometer;
(c) means for establishing a reference pressure in the reference chamber;
(d) means movably mounted in the housing and defining a first piston surface exposed to the fluid pressure in the input chamber, a second piston surface exposed to the fluid pressure in the reference chamber in the same directional sense as said first piston surface, and a third piston surface exposed to fluid pressure in the output chamber in an opposite directional sense, the third piston surface having an area equal to the sum of the areas of the first and second piston surfaces and equal to the area of the first piston surface multiplied by said predetermined factor;
(e) valve means for conducting fluid from the input chamber to the output chamber in response to an increment in pressure of the fluid in the input chamber; and
(f) means for venting the output chamber in response to a decrement in pressure of the fluid in the input chamber.

6. Apparatus for increasing by a predetermined factor the range of a manometer for measuring the pressure of a fluid, comprising:
(a) a housing having an input chamber, a reference chamber and an output chamber, and defining an inlet for admitting to the input chamber the fluid the pressure of which is to be measured, and an outlet communicating with the output chamber and connected to the manometer;
(b) means for establishing a reference pressure in the reference chamber;
(c) means movably mounted in the housing and defining a first piston surface exposed to the fluid pressure in the input chamber, a second piston surface exposed to the fluid pressure in the reference chamber in the same directional sense as said first piston surface, and a third piston surface exposed to fluid pressure in the output chamber in an opposite directional sense, the third piston surface having an area equal to the sum of the areas of the first and second piston surfaces and equal to the area of the first piston surface multiplied by said predetermined factor;
(d) valve means for conducting fluid from the input chamber to the output chamber in response to an increment in pressure of the fluid in the input chamber; and
(e) means for venting the output chamber in response to a decrement in pressure of the fluid in the input chamber.

7. Apparatus for measuring the pressure of a fluid, comprising:
(a) a first manometer having a well and a measuring tube;
(b) a second manometer having a well and a measuring tube;
(c) a pressure regulator for reducing the fluid pressure to be measured by a predetermined factor; the pressure regulator comprising:
(i) a housing defining an inlet chamber, a reference chamber, and an outlet chamber;
(ii) a piston arrangement mounted in the housing for movement in a first direction and selectively in an opposite, second direction, the piston arrangement defining a first piston surface in the inlet chamber, a second piston surface in the reference chamber, and a third piston surface in the outlet chamber, the third piston surface facing in said first direction and the first and second piston surfaces facing in said second direction, and the third piston surface having an area equal to the sum of the areas of the first and second piston surfaces and equal to the area of the first piston surface multiplied by said predetermined factor;
(iii) valve means located in said housing and constructed to assume an open position in response to movement of the piston arrangement in said first direction, and a closed position in response to movement of the piston arrangement in said second direction, the valve means interconnecting the inlet and outlet chambers in the open position, and isolating the outlet chamber from the inlet chamber in the closed position; and
(iv) means for venting the outlet chamber in response to a pressure drop in the fluid pressure to be measured;
(d) means for conducting fluid the pressure of which is to be measured to the inlet chamber and to the well of the first manometer;
(e) means for applying a fluid having a reference pressure to said reference chamber and the measuring tube of the second manometer; and (f) means for connecting said outlet chamber to the measuring tube of the first manometer and the well of the second manometer.

8. Apparatus as claimed in claim 7, wherein said means for venting said outlet chamber include a conduit leading away from the outlet chamber, and a valve biased to close said conduit and constructed to open said conduit in response to movement of the piston arrangement in said second direction by a predetermined amount of travel.

9. Apparatus as claimed in claim 8, wherein said means for applying a fluid having a reference pressure include a vacuum pump.

References Cited

UNITED STATES PATENTS

| 2,356,970 | 8/1944 | Brockett. | |
| 2,433,577 | 12/1947 | Poole | 73—209 |
| 2,659,381 | 11/1953 | Seljos | 137—85 |
| 2,849,883 | 9/1958 | Chapman | 73—401 |

LOUIS R. PRINCE, *Primary Examiner.*

D. O. WOODIEL, *Assistant Examiner.*